United States Patent [19]

Fruchtman et al.

[11] Patent Number: 5,495,603
[45] Date of Patent: Feb. 27, 1996

[54] DECLARATIVE AUTOMATIC CLASS SELECTION FILTER FOR DYNAMIC FILE RECLASSIFICATION

[75] Inventors: Barry Fruchtman; Michael A. Kaczmarski; Ellen J. Waldo, all of Tucson, Ariz.

[73] Assignee: International Business Machines Corporation, Armonk, N.Y.

[21] Appl. No.: 77,222

[22] Filed: Jun. 14, 1993

[51] Int. Cl.$^6$ .................................................. G06F 17/30
[52] U.S. Cl. ................................. 395/600; 364/DIG. 1; 364/222.81
[58] Field of Search ...................... 395/425, 600

[56] References Cited

U.S. PATENT DOCUMENTS

| | | | |
|---|---|---|---|
| 4,071,840 | 1/1978 | Boebert et al. | 364/200 |
| 4,468,732 | 8/1984 | Raver | 364/200 |
| 4,864,497 | 9/1989 | Lowry et al. | 364/300 |
| 4,993,030 | 2/1991 | Krakauer et al. | 370/40.1 |
| 5,018,060 | 5/1991 | Gelb et al. | 364/200 |
| 5,047,918 | 9/1991 | Schwartz et al. | 364/200 |
| 5,063,523 | 11/1991 | Vrenjak | 364/514 |
| 5,093,779 | 3/1992 | Sakurai | 395/600 |
| 5,113,519 | 5/1992 | Johnson et al. | 395/600 |
| 5,115,505 | 5/1992 | Bishop et al. | 395/650 |
| 5,159,647 | 10/1992 | Burt | 382/37 |

FOREIGN PATENT DOCUMENTS

| | | | |
|---|---|---|---|
| 0341230 | 11/1989 | European Pat. Off. | G06F 3/06 |
| 0476841 | 3/1992 | European Pat. Off. | G06F 15/40 |

OTHER PUBLICATIONS

"Including Transisiton Rules in Management Class Definition," IBM Technical Disclosure Bulletin, vol. 32, No. 11, Apr. 1990, New York, USA, p. 93.

Operating Systems/2 Extended Ed. Vers. 1.3 Users Guide, vol. 1: Base Operating System, Ch. 5: "Managing Files and Directories", pp. 5.38–5.40, Intl. Bus. Mach. Corp., Armonk, N.Y.

Personally Safe'n'Sound Users Guide, Lucy Bannell et al., Rel. 0.1.2, Apr. 26, 1991, Ch. 8: "Rule Book Configuration", pp. 19–26, Intl. Bus. Mach. Corp., Armonk, NY.

MVS/ESA Storage Administration Ref., Vers. 3, Release 1, Ch. 8: "Defining ACS Routines", pp. 59–62, International Business Machines Corp. (SC 26–4514), Armonk, NY, No date.

*Primary Examiner*—Thomas G. Black
*Assistant Examiner*—John C. Loomis
*Attorney, Agent, or Firm*—Baker, Maxham, Jester & Meador

[57] ABSTRACT

A system for associating application or system information with data files according to data file attributes. The system employs an Automatic Classification Selection (ACS) filter having an ordered sequence of rule-based declarations, each of which specifies a range of values for selected data file attributes. Each rule-based declaration includes specifications for data file attributes, any of which can be specified using wild-cards. Each data file is tested against the ordered declarations and the first declaration that matches the data file attributes is enabled to assign a classification to that data file. Because the ACS filter is declarative, it may be easily modified without programming expertise. Because any data file can be quickly sieved through the ACS filter, the data file class linkages need not be stored and thus are always dynamically updated in response to changes in data file attributes over time.

20 Claims, 1 Drawing Sheet

DECLARATIVE AUTOMATIC CLASS SELECTION FILTER FOR DYNAMIC FILE RECLASSIFICATION

BACKGROUND OF THE INVENTION

1. Field of the Invention

This invention relates generally to computer-implemented data processing file management systems and, more specifically, to an Automatic Class Selection (ACS) system employing a declarative ACS filter.

2. Discussion of the Related Art

Many useful data file storage management techniques are known in the art. In particular, file classification schemes for associating selected data files to particular storage groups and management classes are necessary for the efficient management of large database systems such as the Multiple Virtual Storage (MVS) Systems Managed Storage (SMS) system introduced by International Business Machines Corporation.

In the MVS/SMS, data file management includes routines for Automatic Class Selection (ACS) based on data file attributes. These ACS routines are used to determine the SMS classes and storage groups for data sets in a SMS complex. This procedure automates and centralizes the determination of SMS classes and storage groups and also facilitates the conversion of data files to a SMS environment.

Unfortunately, these ACS routines are procedural programming language specifications that must be executed to link or assign a management or storage class to a data file. The assigned classes are then stored in a database for later reference by the SMS system. This has several disadvantages. First, there is no provision for automatically updating the class assignments in response to changes in data file characteristics over time. Secondly, the procedure requires both the classification selection step and a database reference step which is inefficient. Finally, the ACS routine cannot be modified without resorting to programming expertise that may not be available to all users. The MVS/SMS ACS routines may be appreciated with reference to U.S. Pat. No. 5,018,060 issued to Gelb et al., and to *MVS/ESA Storage Administration Reference*, Version 3, Release 1, Chapter 8: "Defining ACS Routines", pp. 59–62, International Business Machines Corp. (SC 26-4514), Armonk, N.Y.

Other practitioners have proposed file management systems that provide similar data file attribute linking systems. For instance, the Personally Safe'n'Sound (PSNS) tool in the Operating System/2 (OS/2) Tools Repository provides a rule-based backup system that associates backup attributes with data files using wild-card specifications for directory paths and file names only. Although this provides some automation of the data file backup process, it offers no provision to accommodate attributes other than name and path or changes in data file characteristics. The PSNS file association technique may be appreciated with reference to Lucy Bannell et al., *Personally Safe'n'Sound Users Guide*, Release 0.1.2, Apr. 26, 1991, Chapter 8: "Rule Book Configuration", pp. 19–26, International Business Machines Corp., Armonk, N.Y.

Similarly, the OS/2 File Manager and related file management products provide means for associating executable programs with file names using wild-card notation to determine which programs are to be executed against a selected data file but no provision is made for discriminating among data file attributes other than file name. The OS/2 file association technique may be appreciated with reference to *Operating Systems/2 Extended Edition Version* 1.3 *Users Guide*, Vol. 1: Base Operating System, Chapter 5: "Managing Files and Directories", pp. 5.38–5.40, International Business Machines Corp., Armonk, N.Y.

In U.S. Pat. No. 5,047,918, Mayer D. Schwartz et al., disclose a file management system that provides for data file linkages according to user-definable relationships. Schwartz et al., require an external database in which to store these definable relationships and include in this database an archive of data file versions and their links referred back according to time of creation. Thus, Schwartz et al., neither teach nor consider an efficient file attribute management system that is dynamically responsive to changes in data file attributes.

In Reference U.S. Pat. No. 5,063,523, Milan J. Vrenjak teaches a data communication network management system that permits a user to establish pattern matching rules for filtering incoming events. Again, even if Vrenjak's method were applicable to data file management without undue experimentation, he does not consider dynamic reallocation of linkages.

In U.S. Pat. No. 4,701,840, William E. Boebert et al., disclose a secure data processing system architecture including a secure processing unit for storing and comparing system file attributes and user entity attributes. In U.S. Pat. No. 4,468,732, Norman Raver discloses an automated logical file design system for minimizing database redundancy by sorting data attributes. In the above-cited U.S. Pat. No. 5,018,060, Jack P. Gelb et al., discloses a method for allocating data storage space using implied allocation attributes associated with user-selected parameters. In U.S. Pat. No. 5,115,505, Thomas P. Bishop et al., discloses a multiprocessor dynamic load balancing system employing processor assignment based on allocation parameters inserted into a program object file stored in the file system. In U.S. Pat. No. 5,093,779, Naoki Sakurai discloses a computer file system that allocates files between a high-ranking directory and a low-ranking directory based on file attributes. None of these practitioners teaches or considers a method for automatic data file class selection based on user-selected data file attributes other than file name and path.

Accordingly, there exists a clearly-felt need in the art for a simple user-specified association between data files and file management classes that does not rely on external storage of class linkages or custom-programmed selection routines and that is responsive to dynamic changes in data file attributes. The related problems and deficiencies are clearly felt in the art and are solved by this invention in the manner described below.

SUMMARY OF THE INVENTION

This invention introduces the ACS filter consisting of several user-specified rule-based declarations that assign new application or system attributes to an existing data file. These rule-based declarations are organized to select new attributes or classes according to existing data file attributes. The association may be reevaluated upon each data file access so that the application or system attribute linkages are changed automatically as data file characteristics change over time. The user may change the rule-based declarations at any time, without programming expertise, to assign new attributes to files as requirements change. Several different ACS filters may be established for different system requirements. The data file application system class linkages need not be stored because they may be redetermined at any time with a new reference to the ACS filter. Finally, the ACS filter of this invention may pass data files through to existing executable class selection routines that make the necessary linkages for certain data files where appropriate.

It is an object of this invention to provide a simple declarative ACS method for data files. It is an advantage of the method of this invention that no user programming skill is required to specify the data file class selection criteria.

It is another object of this invention to provide dynamic data file class selection responsive to changes in data file attributes over time. It is an advantage of this invention that the data file class is newly selected whenever the data file is presented to the ACS filter. Because the data file class linkage need not be stored, the data file class can be automatically redetermined whenever the data file is opened, thus ensuring dynamic updating of the data file class linkage.

It is yet another object of this invention to provide a single, highly optimized matching procedure that may be used in a variety of storage system environments. It is an advantage of the method of this invention that the ACS filter structure is declarative and thus independent of platform or environment.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiment as illustrated in the accompanying drawing, wherein.

DETAILED DESCRIPTION OF THE PREFERRED EMBODIMENTS

The Declarative Automatic Class Selection (ACS) Filter

In general, computer-implemented storage management systems require a user-specified association between data files and file management classes. These "class selection" associations describe how the files are to be managed by the storage management system. The file management class associated with a data file determines, for instance, how often the file is backed up, how many backup versions are maintained for the data file and the storage location of the file copy or copies. The system of this invention provides for the specification of this class association using "declarative" rules maintained in an ACS filter table. The ACS filter is used to test data file attributes, thereby identifying the file management class (or any other linked attribute) that must be associated with the data file.

Figure 1:
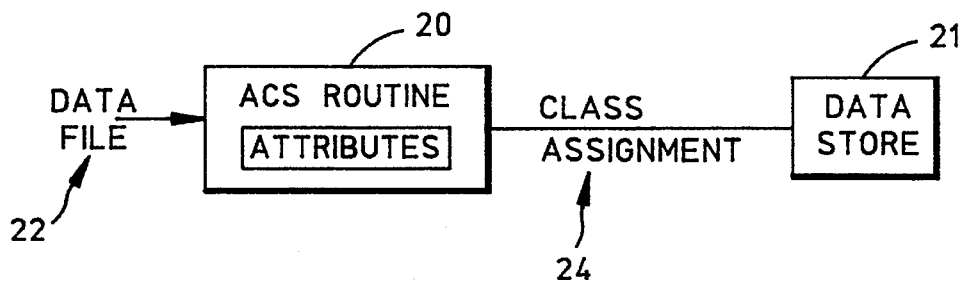
FIG. 1 shows a simple functional block diagram of an ACS system from the prior art.

FIG. 1 illustrates this class assignment procedure as it is used in the prior art. A user-customized ACS routine 20 is prepared using a suitable programming language. Each of the file attribute tests are embedded in the ACS routine by the programmer. After debugging, ACS routine 20 is installed in the storage system 21 and invoked by the system manager to assign data file classes as necessary. When invoked, routine 20 processes the existing data file attributes 22 to obtain a class assignment 24. Class assignment 24 is then stored in data storage 21 with permanent linkage to data file 22.

Unless routine 20 is then later invoked for data file 22, this prior art ACS technique is unable to accomodate dynamic changes in attributes 22. Moreover, frequent execution of routine 20 is not desired because of the system overhead and resulting inefficiency. Storage of class assignment 24 also contributes to general system inefficiency. Because of these relative inefficiencies, the ACS procedure illustrated in FIG. 1 is not suitable for smaller data processing systems and is presently known only in the larger MVS/SMS class of data processing systems.

An illustrative embodiment of the ACS filter of this invention is shown in Table 1 below.

TABLE 1

| Storage Group Name | Directory Path | File Name | File Size | File (DOS) Attributes | Existing Management Class | Assigned Management Class |
|---|---|---|---|---|---|---|
| SYSTEM | \OS2\*\ | *.* | * | * | * | NOBACKUP |
| DATA | \ACCOUNTS | *.WKS | >300k | * | * | BACKUPNOW |
| TOOL* | \* | *.SYS | * | SH | * | MONTHLY |
| TOOL* | \* | *.INI | * | * | MONTHLY | DAILY |
| TOOL* | \* | *.INI | * | * | * | DAILY |
| TOOL* | \* | *.* | * | R | * | RUN (CRITMC) |
| * | \* | * | * | * | * | DEFAULT |
| ... | | | | | | |

Figure 2:
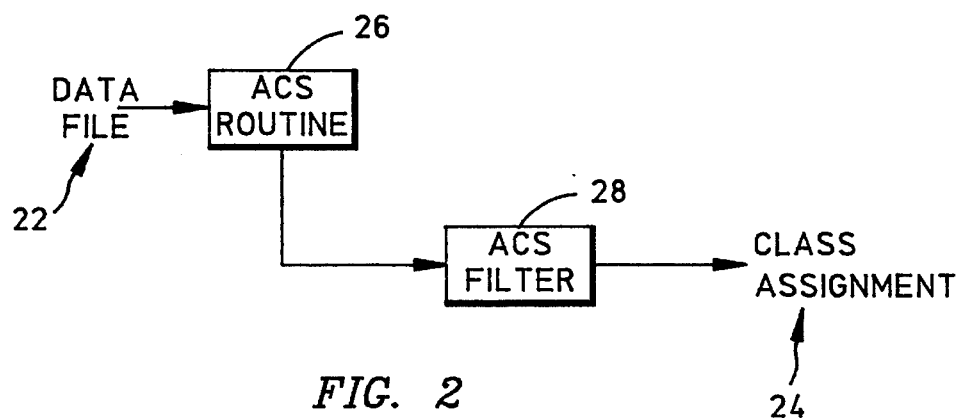
FIG. 2 shows a simple functional block diagram of the ACS filter system of this invention.

The ACS filter specification in Table 1 is not a detailed example but serves to illustrate the basic layout and operation of such a data object. Table 1 can be viewed essentially as a drop-through "sieve". The declaratory rules are generated by the user to assign management classes to categories of data files whose attributes match the expressions specified. The declaratory rules are referenced by the general-purpose ACS routine 26 in FIG. 2, which differs from ACS routine 20 in FIG. 1 because it is neither customized nor user-written. That is, ACS routine 26 can be provided as an element of the storage system itself. Referring to FIG. 2, ACS routine 26 references the declaratory rules in the ACS filter 28 (Table 1) to derive class assignment 24 from the attributes of data file 22.

The declaratory rule list (Table 1) is searched from top to bottom and left to right using the actual data file attributes 22 (FIG. 2). The first match found specifies the management class that is assigned to the data file. The "Assigned Management Class" column must provide a specific entry without wild-cards. Although more than one declaratory rule (row) may match the incoming data file specifications 22, routine 26 selects the first matching row as the class assignment. The ordering of the rows within ASC filter 28 is user-selected.

Figure 3:
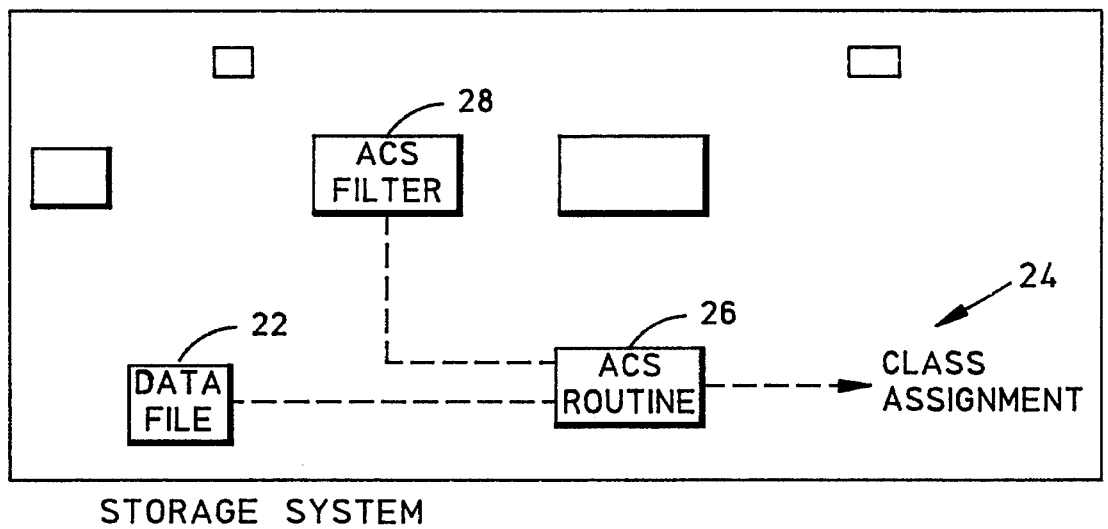
FIG. 3 shows an illustrative ACS filter embodiment in a data object storage environment.

FIG. 3 provides a simple block diagram of an illustrative storage system of this invention containing a plurality of data objects. It can be appreciated from FIG. 3 that the above discussion in connection with FIG. 2 is applicable to the like-named data objects shown in FIG. 3.

Referring to Table 1, declaratory rules may use wild-card notation for matching file attributes. For example, character attribute matching rules may use "?" and "*" to match a single character or string of characters, respectively, and numeric attribute matching rules may use comparison operators (>, < or =) to compare the actual data file attribute value with the value specified by the declaratory rule. In Table 1, improved over the prior art. Finally, no user programming expertise is required. Modification of ACS filter 28 is accomplished merely by changing the declarative rules illustrated in Table 1. ACS routine 26 need never be modified when using the ACS filter 28 of this invention.

It can be apreciated that the ACS method of this invention may be used to associate constructs other than Management Class with data files. The filtering mechanism can be used to bind constructs such as storage class and the like. Attributes such as data file format, allocated size and the like may be used as filtering specifications to accomplish this task.

In general, the filtering approach may be used to associate any policy constructs with any data object based on attributes of the data object in a straightforward declarative manner. For instance, the ACS filter in Table 1 may be extended to provide for "custom attributes", as illustrated in the following Table 2.

TABLE 2

| Storage Group | Directory Path | File Name | File Size | File (DOS) Attributes | Custom Attr #1 | Custom Attr #2 | Input Management Class | Assigned Management Class |
|---|---|---|---|---|---|---|---|---|
| SYSTEM | \OS2\*\ | *.* | * | * | ACY* | * | * | NOBACKUP |
| DATA | \ACCOUNTS | *.WKS | >300k | * | ENG* | * | * | BACKUPNOW |
| TOOL* | \8 | *.SYS | * | S | * | * | * | MONTHLY |
| TOOL* | \* | *.INI | * | * | * | * | MONTHLY | DAILY |
| TOOL* | \* | *.INI | * | * | * | * | * | DAILY |
| TOOL* | \* | *.* | * | * | * | TED | * | YEARLY |
| TOOL* | \* | *.* | * | * | * | JOHN | * | YEARLY |
| * | \* | * | * | * | * | * | * | RUN (MCASSIGN) |
| ... | | | | | | | | | a data file larger than 300K bytes will match column 4 of the second row, for instance.

Where additional processing is needed to associate information with the file, the application information assigned by the declaratory rule of specification may include reference to a particular executable routine. In Table 1, files having attributes matching the specification in the sixth row are passed to an executable routine CRITMC, as indicated by the RUN(. . . ) specification in the Assigned Management Class column. The CRITMC routine may be a user-customized ACS routine of the type illustrated in FIG. 1, for example. Such routine is then responsible for assigning additional management class or other information to the data file in whatever manner is provided for by the customizing user.

The declaratory attribute matching rules shown in Table 1 can be extended to include other constructs, such as range checking or set membership/nonmembership. Although the types and numbers of file attributes vary extensively across different data systems, the ACS system of this invention can be adapted to any such system merely by modifying the rule declarations illustrated in Table 1. Note that the ACS system shown in FIG. 3 does not require storage of class assignment 24. This is because general ACS routine 26 can be automatically invoked whenever class assignment 24 information is desired by the system. The advantages of this are several. First, class assignment 24 is always determined for the most recent version of data file 22, thereby always responding to dynamic changes in the characteristics and attributes of data file 22. As an example, consider the change in class assignment 24 resulting from a 300K byte increase in size of data file 22 that results from using ACS filter 28 shown in Table 1. Secondly, because class assignment 24 need not be saved, memory and processor efficiency is The columns labelled "Custom Attr 1" and "Custom Atrr 2" denote file attributes that may be assigned and specified by the user for inclusion in ACS filters. For example, the first may be accounting information while the second may refer to ownership of the data object. After data files are assigned the custom attribute values, the ACS filter in Table 2 operates as discussed in connection with Table 1, assigning management class based on wild-card matching, including matching of user-defined custom attributes.

ACS Filter Wild-Card Specifications

The following wild-card specifications are suitable for use in the "columns" of the ACS filter specification table to match data file attributes passed into the ACS routine.

| | |
|---|---|
| * | When used in a string specification, the "*" character matches 0 or more characters for the attribute value passed into the filter routine. For example SYS* matches SYS, SYSTEM, SYS01, and does not match STS5. |
| ? | When used in a string specification, the "?" character matched one character for the respective attribute value passed into the filter routine. For example, the specificaiton SYS?E? matches SYSTEM AND SYSGEN, but not SYSB01. |
| string | When used in a string specification, the specification matches ONLY the string value specified. For example, the specification SYSTEM matches SYSTEM only. |
| !string | When used in a string specification, the specification matches ALL strings BUT the string value specified. For example, the specification !SYSTEM matches SYSGEN, but nor SYSTEM. |
| !NULL | When used in a string specification, the specification matches ALL non-null (0-length) |

|  |  |
|---|---|
| >n | For a numeric attribute, this specification matches any value specified that is greater than the numeric value "n". For example, the specification >5000 matches 10000, 5001, but not 5000. |
| <n | For a numeric attribute, this specification matches any value specified that is less than the numeric value "n". For example, the specification <5000 matches 100, 50 but not 50000. |
| =n | For a numeric attribute, this specification matched only a value specified that is exactly equal to the numeric value "n". |
| (str1, str2, . . . ) | When used in a string specification, the specification matches any string in the list specified. The string list may also contain "*" and "?" wildcards (see above). |
| !(str1, str2, . . . ) | When used in a string specification, the specification matches any string NOT in the list specified. The string list may also contain "*" and "?" wildcards (see above). |

An Example ACS Filter

An exemplary ACS rule definition is now discussed. The ACS filter definition provides parameters for a SYSTEM STORAGE GROUP, assumed to contain the OS/2 operating system files that are normally in the C: drive and other storage groups containing spreadsheets, drawings and miscellaneous data files. The example ACS definition is specified in Table 3.

TABLE 3

```
DEFINE_ACS_RULE
    ACE_NAME(EXAMPLE)
    DESCRIPTION(Example ACS Rule definition for an OS/2 User)
    MATCH( DESCRIPTION(Do not backup the OS/2 Operating System)
        STORAGE_GROUP(SYSTEM)
        DIRECTORY_PATH((\OS2*, \DOS\*, \SPOOL\*, \MUGLIB\*, \CMLIB\*, SQLLIB\*, \IBMLAN\*))
        FILE_NAME(*)
        FILE_SIZE(*)
        FILE_ATTRIBUTES(*)
        ASSIGN_MGMT_CLASS(NOBACKUP)
    MATCH( DESCRIPTION(Do NOT backup selected Files in system Root directory)
        STORAGE_GROUP (SYSTEM)
        DIRECTORY_PATH(\)
        FILE_NAME(!(*.CMD, *.SYS, *.BAT))
        FILE_SIZE(*)
        FILE_ATTRIBUTES(*)
        ASSIGN_MGMT_CLASS(NOBACKUP))
    MATCH( DESCRIPTION(Backup selected Files in system Root directory)
        STORAGE_GROUP (SYSTEM)
        DIRECTORY_PATH(\)
        FILE_NAME((*.CMD, *.SYS, *.BAT))
        FILE_SIZE(*)
        FILE_ATTRIBUTES(*)
        ASSIGN_MGMT_CLASS(WEEKLY)
    MATCH( DESCRIPTION(Backup Product Programs monthly)
        STORAGE_GROUP(*)
        DIRECTORY_PATH(*)
        FILE_NAME((*.EXE, *.COM, *.SYS, *.DLL))
        FILE_SIZE(*)
        FILE_ATTRIBUTES(*)
        ASSIGN_MGMT_CLASS(MONTHLY))
    MATCH( DESCRIPTION(Backup User's Daily - important)
        STORAGE_GROUP(*)
        DIRECTORY_PATH(*)
        FILE_NAME((*.CDR, *.WKS))
        FILE_SIZE(*)
        FILE_ATTRIBUTES(*)
        ASSIGN_MGMT_CLASS(DAILY)
    MATCH( DESCRIPTION(Backup Large Files Weekly)
        STORAGE_GROUP(*)
        DIRECTORY_PATH(*)
        FILE_NAME(*)
        FILE_SIZE(>500000)
        FILE_ATTRIBUTES(*)
        ASSIGN_MGMT_CLASS(WEEKLY)
    MATCH( DESCRIPTION(Backup all other file twice a week)
        STORAGE_GROUP(*)
        DIRECTORY PATH(*)
        FILE_NAME(*)
        FILE_SIZE(*)
        FILE_ATTRIBUTES(*)
        ASSIGN_MGMT_CLASS(TWICEAWEEK);
```

Table 2 assumes that the management classes are named, in general, for the backup frequency specified in the management class itself. It is management class "DAILY" as a backup frequency of one day. The OS/2 operating system files are not backed up because the management class is NOBACKUP. This is because the operating system itself must be reinstalled if a failure occurs. The system will be restored from a control archive. OS/2 must be up and operational on a node before any data files can be restored. Thus, such installation is required before file recovery. The OS/2 operating system includes files in the directories of \, \OS2, DOS, \SPOOL, \MUGLIB, \CMLIB, \SQLLIB and \IBMLAN.

Files with extensions .BAT, .CMD and .SYS are backed up from the root of the system storage group on a weekly basis because they contain information that users will likely customize and may need at at later date. Examples include STARTUP.CMD, AUTOEXEC.BAT and CONFIG.SYS. Files with the .EXE, .COM, .DLL and .SYS extensions are only backed up monthly wherever they reside. This is because these files usually represent programs or program products that are available for reinstallation if a failure occurs. The ACS filter may be differently specified if the workstation user is a software developer, where the selected extensions may represent integral elements of a system under developement.

User data files such as *.WKS and *.CDR are backed up on a daily basis because they represent primary information used regularly on the workstation. Large files are backed up on a weekly basis (greater than 500,000 bytes). The reasoning for this is to minimize the daily back up time necessary by deferring movement of larger files to weekly backups. All other files that fall through the upper declarations are associated with the TWICEAWEEK management class.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In a computer system having means for storing a plurality of files each having one or more file attributes and for storing at least one Automatic Class Selection (ACS) filter, a method for assessing the file management class of said files comprising the steps of:

responsive to the opening of a first said file, referencing said Automatic Class Selection (ACS) filter in said storage means wherein said ACS filter includes an ordered plurality of rule declarations each specifying a range of values for a plurality of said file attributes and at least one file management class;

testing in sequence each said rule declaration for coincidence with the file attributes of said first file until first encountering a rule declaration that coincides with said first file attributes; and selecting for said first file the file management class specified in said first encountered coincident rule declaration; and retesting said rule declarations and reselecting said file management class for said first file responsive to a subsequent reopening of said first file.

2. The method of claim 1 wherein said file attributes include a plurality of file identifiers and a plurality of file characteristics and wherein each said rule declaration specifies a value for at least one of said plurality of file characteristics.

3. The method of claim 2 wherein said plurality of file identifiers includes a file name, a file directory and a file storage group.

4. The method of claim 3 wherein said plurality of file characteristics includes a file size designation and one or more file type designations.

5. The method of claim 4 further including the step of:

storing said selected file management class for said first file in said storage means.

6. The method of claim 2 wherein said plurality of file characteristics includes a file size designation and one or more file type designations.

7. The method of claim 1 further including the step of:

storing said selected file management class for said first file in said storage means.

8. In a computer system having means for storing a plurality of files each having one or more file attributes, a method for classifying said files comprising the steps of:

establishing at least one Automatic Class Selection (ACSD filter in said storage means wherein said ACS filter includes an ordered plurality of rule declarations each specifying a range of values for a plurality of said file attributes and at least one file management class;

testing in sequence each said rule declaration for coincidence with the file attributes of a first said file until first encountering a rule declaration that coincides with said first file attributes; and assigning to said first file the file management class specified in said first encountered coincident rule declaration, wherein said assigned file management class refers to an executable ACS procedure.

9. The method of claim 8 wherein said file attributes include a plurality of file identifiers and a plurality of file characteristics and wherein each said rule declaration specifies a value for at least one of said plurality of file characteristics.

10. The method of claim wherein said plurality of file identifiers includes a file name, a file directory and a file storage group and said plurality of file characteristics includes a file size designation and one or more file type designations.

11. In a computer system having means for storing a plurality of files each having one or more file attributes, a computer file management system for dynamically reclassifying said files in accordance with said file attributes, said management system comprising:

ACS filter means having at least one Automatic Class Selection (ACS) filter that includes an ordered plurality of rule declarations each specifying values for a plurality of said file attributes and at least one file management class;

tester means coupled to said ACS filter means for referencing said ACS filter responsive to the opening of a first said file to test in sequence each said rule declaration for coincidence with the file attributes of said first file and for identifying the first encountered said rule declaration that coincides with said first file attributes; and classifier means coupled to said tester means for selecting for said first file the management class specified in said first encountered coincident rule declaration.

12. The computer file management system of claim 11 wherein said file attributes include a plurality of file identifiers and a plurality of file characteristics and wherein each said rule declaration specifies a value for at least one of said plurality of file characteristics.

13. The computer file management system of claim 12 wherein said plurality of file identifiers includes a file name, a file directory and a file storage group.

14. The computer file management system of claim 13 wherein said plurality of file characteristics includes a file size designation and one or more file type designations.

15. The file management system of claim 14 further comprising:

means coupled to said classifier means for storing said selected file management class for said first file in said storage means.

16. The computer file management system of claim 12 wherein said plurality of file characteristics includes a file size designation and one or more file type designations.

17. The file management system of claim 11 further comprising:

means coupled to said classifier means for storing said selected file management class for said first file in said storage means.

18. In a computer system having means for storing a plurality of files each having one or more file attributes, a computer file management system for automatically classifying said files in accordance with said file attributes, said management system comprising:

filter means having an ordered plurality of rule declarations each specifying values for a plurality of said file attributes and at least one file management class;

tester means coupled to said filter means for testing in sequence each said rule declaration for coincidence with the file attributes of a first said file and for identifying the first said rule declaration that coincides with said first file attributes;

link means coupled to said tester means for assigning to said first file a management class specified in said first coincident rule declaration; and means coupled to said link means for executing an ACS procedure responsive to the assignment of a file management class to said first file.

19. The computer file management system of claim 18 wherein said file attributes include a plurality of file identifiers and a plurality of file characteristics and wherein each said rule declaration specifies a value for at least one of said plurality of file characteristics.

20. The computer file management system of claim 19 wherein said plurality of file identifiers includes a file name, a file directory and a file storage group and said plurality of file characteristics includes a file size designation and one or more file type designations.

* * * * *

UNITED STATES PATENT AND TRADEMARK OFFICE
CERTIFICATE OF CORRECTION

PATENT NO.   : 5,495,603
DATED        : February 27, 1996
INVENTOR(S)  : Fruchtman et al It is certified that error appears in the above-indentified patent and that said Letters Patent is hereby corrected as shown below:

Column 10, line 13, change "(ACSD" to --(ACS)--.

Signed and Sealed this

Twenty-seventh Day of May, 1997

Attest:

BRUCE LEHMAN

*Attesting Officer*     Commissioner of Patents and Trademarks